(12) United States Patent
Santa Cruz et al.

(10) Patent No.: US 6,279,958 B1
(45) Date of Patent: Aug. 28, 2001

(54) FOOD PORTION TABULATOR AND METHOD OF USE

(76) Inventors: Cathy D. Santa Cruz, 7630 Tholl Dr., Reno, NV (US) 89506; Jeffrey N. Mikkelsen, P.O. Box 13630, Reno, NV (US) 89507

( * ) Notice: Subject to any disclaimer, the term of this patent is extended or adjusted under 35 U.S.C. 154(b) by 0 days.

(21) Appl. No.: 09/422,123

(22) Filed: Oct. 20, 1999

(51) Int. Cl.$^7$ .......................... G07C 13/00; G09B 19/02; G09F 11/00
(52) U.S. Cl. ............................ 283/65; 283/115; 283/48.1; 235/85 R; 235/61 B; 235/61 D; 235/90; 40/375
(58) Field of Search .................. 283/115, 48.1, 283/65; 235/85 R, 61 B, 61 D, 90; 40/375

(56) References Cited

U.S. PATENT DOCUMENTS

| | | | |
|---|---|---|---|
| 4,258,249 | * | 3/1981 | Ahmann ........................... 235/50 R |
| 4,521,675 | * | 6/1985 | Yakich ................................ 235/90 |
| 4,750,398 | * | 6/1988 | Rude et al. ......................... 235/70 |
| 5,382,165 | * | 1/1995 | Knox ................................. 434/127 |
| 5,915,854 | * | 6/1999 | Burke et al. ...................... 283/115 |

\* cited by examiner

*Primary Examiner*—A. L. Wellington
*Assistant Examiner*—Mark T. Henderson

(57) ABSTRACT

A food portion tabulator device that is an aid for calculating and evaluating an individuals daily intake of food portions. The device is self-contained, having various indicia pertinent to various food groups thereon, includes movable pins which correspond to each of the food groups, and includes a unique housing that automatically resets the pins for the next day's use.

6 Claims, 1 Drawing Sheet

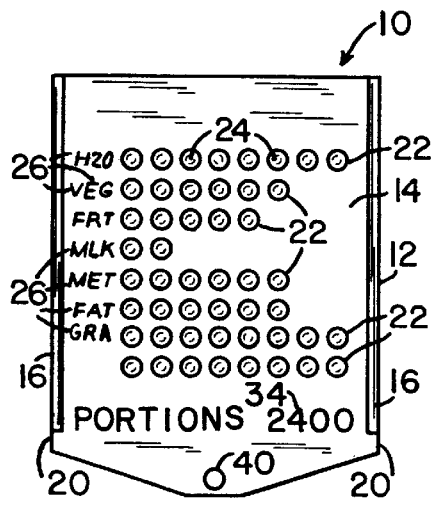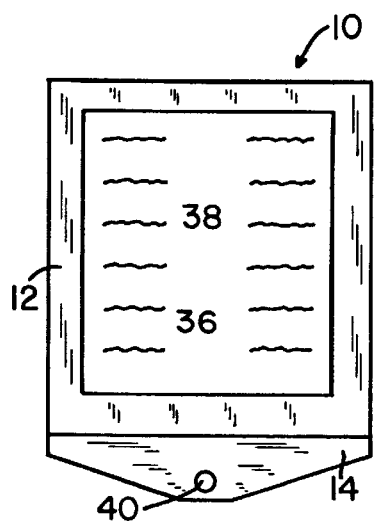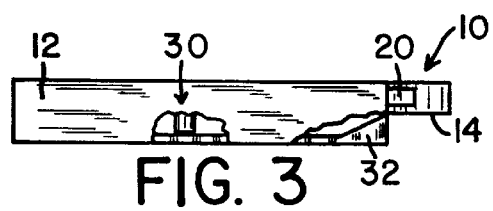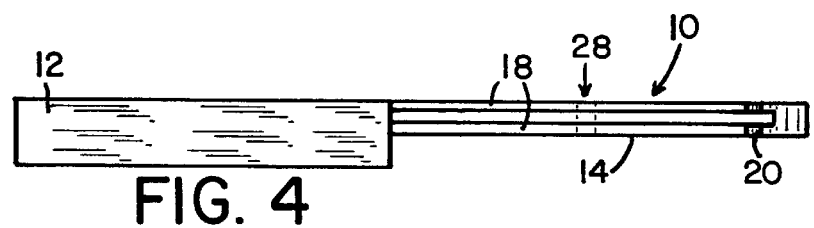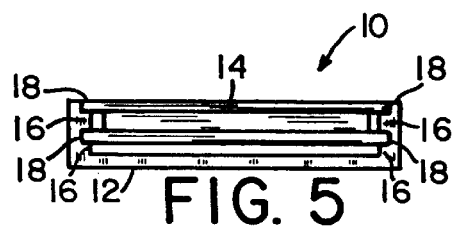

FOOD PORTION TABULATOR AND METHOD OF USE

FIELD OF THE INVENTION

This invention relates to devices and methods used for calculating and evaluating a persons daily intake of food portions, but more particularly relates to a portable reusable self contained device having various indicia relating to different food groups thereon, and moveable pins which correspond to each of the food groups. Also, the device includes a unique housing that automatically resets the pins for the next day's use.

BACKGROUND OF THE INVENTION

In today's society there is a growing concern regarding health related matters, and more particularly there is an increase of individuals who are highly concerned with maintaining a balanced healthy diet. Therefore, various diets and methods have been taught in the past which either assist an individual to lose weight, maintain one's present weight, or provide regulated food intake systems for recording one's daily consumption so as to maintain a well-balanced diet.

Unfortunately, these prior art food-regulating devices have many inherent drawbacks, such as most of these devices necessitate that the user must calculate and estimate their daily calorie intake along with accounting for their total servings from each of the food groups. This can be very time consuming and difficult to manage. Thus, these systems tend to always fail as the user becomes very frustrated when faced with estimating the calories contained in different food portions, as well as being responsible for counting and planning in advance for the meals to be consumed each day.

Although calorie counting has been approached in many ways, these systems all suffer with the same drawbacks. In addition to the counting problems associated within the prior art, they ineffectively deal with the requirement that dieter's maintain well-balanced meals consisting of all food groups in order to assure that no adverse effects will be experienced from the particular diet program being used. Also, prior art diet programs and systems are traditionally rigid and limited to specific food types and meals which can be consumed without jeopardizing the diet program. As a result, these prior art diet programs and systems are short-lived and fail to attain the desired results which the user wishes to achieve.

It is therefore contended by the applicants, that there is a real need for improvement within the field of diet control systems and methods, and most importantly there needs to be a simple system or device which is very convenient and usable on a daily basis.

SUMMARY OF THE INVENTION

It is therefore an object of the present invention to provide a food portion tabulator that is compact, portable, and very efficient for determining and calculating one's daily consumption of the various food groups. In fact, the device is so compact and portable that it is intended to be carried on one's person throughout the day, as it is specifically designed to be easily carried on one's key chain, within one's pocket or purse, or attached onto a wrist band, etc.

It is a further object of the present invention to provide a food portion tabulator that is of simple construction, is economical to manufacture, and easily marketable.

Yet another object of the present invention is to provide a food portion tabulator that is aesthetically pleasing to the eye and fun to use. Thus, the device is less likely to be bothersome, will encourage effective portion management, and will lead to a higher and longer success rate in a manner heretofore not taught within the known prior art.

A very important object of the present invention is to provide a food portion tabulator that is reusable on a daily basis. Thus, when one is finished with the device for that day, the device can be easily reset by manually sliding the device between a set position and a reset position.

Still a further object of the present invention is to provide a food portion tabulator and method of use which is unique and novel, and overcomes the inherent disadvantages and drawbacks within the known prior art.

Other objects and advantages will become apparent when taken into consideration with the following drawings, specification and claims.

BRIEF DESCRIPTION OF THE DRAWINGS

FIG. 1 is substantially a front view of the preferred embodiment for the present invention.

FIG. 2 is substantially a back view of the preferred embodiment for the present invention.

FIG. 3 is substantially a side view of the present invention when in a closed position.

FIG. 4 is substantially a side view of the present invention when in an open position.

FIG. 5 is substantially a top end view of the present invention.

DETAILED DESCRIPTION OF THE DRAWINGS

Referring now in detail to the drawings wherein like characters refer to like elements throughout the various views. Within FIGS. 1–5, (arrow 10) substantially represents an overview for the present invention which is a food portion tabulator device and can be used for calculating and evaluating a persons daily intake of food portions. It is to be understood that the device (arrow 10) may be made from substantially any suitable material of engineering choice, such as hard rubber, wood, etc. However, the applicants contend that the most suitable material of choice is plastic. Thus, the device can be made from a plastic injection mold.

It is to be further understood that the device (arrow 10) is not to be limited to the embodiment as depicted herein, but is to include other various embodiments of engineering choice. For example, the device may be made in the form of a printed card, and may include perforated punch holes, or simply circles that may be colored by the user, or the like.

Although the above embodiments would be functional, the applicants prefer to disclose a food portion tabulator (arrow 10) comprising of a housing (12) and a tabulator member (14). With tabulator member (14) being slidably engaged within housing (12) between a closed position, as depicted in FIGS. 1–3, & 5, and an open position as depicted in FIG. 4. Any suitable sliding means of engineering choice may be used, such as we provide housing (12) with multiple guide rails (16) which are of a size and shape to slidably receive multiple flanges (18) therein, with flanges (18) being located on tabulator member (14). Whereby, tabulator member (14) may be easily manually moved from the closed position into the open position and vice-versa.

Tabulator member (14) may further include stop means of engineering choice that inhibits separating housing (12) from tabulator member (14) and also stops tabulator member (12) at the desired location when tabulator member (12) is in the closed position. For example tabulator member may include multiple tabs (20), and when tabulator member (14) is in the closed position, multiple tabs (20) are urged against each exterior side wall of housing (12), thus restricting further movement of tabulator member (14).

Tabulator member (14) having multiple rows of openings (22) therein and multiple symbols (26) thereon, with each of the symbols (26) representing a different food group, and each of the multiple rows of openings (22) being substantially aligned with one of the multiple symbols (26). It is to be noted any suitable symbols (26) of engineering choice may be used, such as symbols (26) may be in the form of illustrations, wherein each of the food groups are illustrated by picture.

For example, H2O may be represented in the shape of a rain-drop, vegetables may be represented by a carrot, fruit may be represented by an apple, dairy products may be represented by a cow, meat may be represented by a steak, fat may be in the shape of a french-fry, and grains may be represented by cereal, etc. Or any other representative illustration of choice may be used.

Another example of suitable symbols (26) includes each of the symbols (26) being in the form of abbreviations, such as "H2O" is water, "VEG" is vegetables, "FRT" is fruits, "MLK" is dairy, "MET" is meat, "FAT" is fats, "GRA" is grains, etc as depicted in FIG. 1.

Still another unique example of suitable symbols (26) includes each of the symbols being displayed in the form of Braille. Although not shown it is to be inherent within the present invention, as this allows a person who has a visual impairment to easily use the device, and nowhere in the prior art did the applicants find a suitable food portion device which would allow such individuals this novel privilege.

Each of the openings (22) containing a slidable pin (24) which is frictionally retained therein. Each slidable pin (24) having an up position as illustrated by (arrow 28) shown in ghost lines within FIG. 4., and a down position as illustrated by arrow (30) in FIG. 3, and housing (12) having a substantially raised elongated protrusion (32).

It will now be seen when each slidable pin (24) is in the down position, and tabulator member (14) is manually moved from the closed position into the open position, the slidable pin (24) is automatically reset from the down position into the up position as the slidable pin (24) contacts and slides up onto the raised elongated protrusion (32).

Tabulator member (14) may further include indicia (34) thereon which may be used to represent total recommended daily calorie intake. It is to be understood the food portion tabulator (arrow 10) can be manufactured having different numbers or different suggested daily calorie indicia (34) thereon of engineering choice. This allows the device (arrow 10) to be used by various individuals having different calorie intake needs.

Housing (12) may further include a reference guide (36) of engineering choice having indicia (38) thereon, whereby the user can easily determine what signifies proper food portions. For example, three servings of meat are substantially equal in size to a deck of playing cards, or the like. Again it is to be understood, substantially any suitable type of indicia may be used to signify recommended food portions, such as written words, illustrations, Braille, etc. Or if preferred, the reference guide (36) may include instructions thereon that explicitly informs the user as to proper use of the food portion tabulator device (arrow 10).

Furthermore, the food portion tabulator (arrow 10) may further include a hole (40) which can be used to attach food portion tabulator (arrow 10) onto a key chain, a wrist band, a belt loop, or the like.

Still further, it is to be understood the food portion tabulator (arrow 10) can be produced in a variety of colors of engineering choice. Or each of the pins (24) may be color coded to match their associated symbols (26), such as, one of the multiple rows of pins (24) may be colored blue and be aligned with H2O.

It is to be further understood each of the multiple rows of openings (22) should include the proper amount of pins (24) which reflect the proper amount of food portions associated therewith. For example, the row of openings (22) containing pins (24) which is aligned with the symbol H2O, should include eight openings, which signifies to the user the recommended daily requirement of water is eight glasses, or the like.

It will now be seen we also herein we provide a unique method for using a food portion tabulator (arrow 10) comprising the following steps:

a. determining how many portions of a food group the user has consumed during a meal;
b. grasping a pointed object, such as a pencil or the like;
c. locating a pin (24) on the food portion tabulator (arrow 10) which corresponds to one of the pre-determined portions of a food group the user has consumed during a meal and which is aligned with the proper symbol (26);
d. positioning the pointed object over pin (24);
e. inserting the pointed object into pin (24) until pin (24) stops;
f. repeating steps c–e for each of the pre-determined portions of a food group;
g. repeating steps a–f after every meal during one day; and;
h. resetting each pin (24) at the end of the day by manually sliding food portion tabulator (arrow 10) into an open position, then manually sliding said food portion tabulator into a closed position.

Although the invention has been herein shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus.

Having described the invention what we claim as new and wish to secure by Letters Patent is:

1. A food portion tabulator comprising: a housing and a tabulator member, said tabulator member being slidably engaged within said housing between a closed position and an open position, said tabulator member having multiple rows of openings therein, said tabulator member having multiple symbols thereon, said multiple symbols each representing a different food group, each of said multiple rows of openings being aligned with one of said multiple symbols, each of said openings containing a slidable pin therein, said slidable pin having an up position and a down position, and said housing having a raised elongated protrusion, whereby:

when said slidable pin is in said down position and said tabulator member is manually moved from said closed position into said open position, said slidable pin is automatically reset from said down position into said up position when said slidable pin contacts said raised elongated protrusion.

2. The food portion tabulator of claim 1 wherein said tabulator member further includes indicia thereon representing recommended total daily calorie intake.

3. The food portion tabulator of claim 1 wherein said housing further includes a reference guide.

4. The food portion tabulator of claim 1 wherein said multiple symbols each representing a different food group are abbreviations.

5. The food portion tabulator of claim 1 wherein said multiple symbols each representing a different food group are illustrations.

6. The food portion tabulator of claim 1 wherein said multiple symbols are Braille.

* * * * *